United States Patent
Masuyama

(10) Patent No.: US 6,214,909 B1
(45) Date of Patent: *Apr. 10, 2001

(54) POLYSTYRENIC RESIN COMPOSITION

(75) Inventor: Akitoshi Masuyama, Ichihara (JP)

(73) Assignee: Idemitsu Kosan Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,800

(22) PCT Filed: May 7, 1996

(86) PCT No.: PCT/JP96/01209

§ 371 Date: Nov. 10, 1997

§ 102(e) Date: Nov. 10, 1997

(87) PCT Pub. No.: WO96/35752

PCT Pub. Date: Nov. 14, 1996

(30) Foreign Application Priority Data

May 8, 1995 (JP) .................................... 7-109508

(51) Int. Cl.$^7$ ...................................... C08K 5/15
(52) U.S. Cl. .................. 524/119; 524/117; 524/120; 524/291; 524/353
(58) Field of Search .................. 524/117, 119, 524/120, 353, 291

(56) References Cited

U.S. PATENT DOCUMENTS

| 5,145,950 | * | 9/1992 | Funaki | 528/481 |
| 5,164,479 | * | 11/1992 | Funaki et al. | 524/115 |
| 5,166,238 | * | 11/1992 | Nakano et al. | 524/120 |
| 5,436,397 | * | 7/1995 | Okada | 524/494 |
| 5,698,652 | | 12/1997 | Aoyama et al. | |
| 5,760,105 | * | 6/1998 | Okada et al. | 524/504 |
| 5,777,021 | * | 7/1998 | Nakano | 524/508 |

FOREIGN PATENT DOCUMENTS

| 0 318 794 | 6/1989 | (EP) . |
| 0 356 857 | 3/1990 | (EP) . |
| 0 380 968 | 8/1990 | (EP) . |
| 0 587 098 | 3/1994 | (EP) . |
| WO 94/24206 | 10/1994 | (WO) . |

* cited by examiner

Primary Examiner—Veronica P. Hoke
(74) Attorney, Agent, or Firm—Oblon, Spivak, McClelland, Maier & Neustadt, P.C.

(57) ABSTRACT

A resin composition comprising polystyrene having the syndiotactic configuration (SPS) showing improved heat stability in heat molding at a high temperature is obtained by adding a combination of a phenolic antioxidant and an antioxidant containing phosphorus to SPS. The molded article is obtained by using the resin composition as the material. Additional use of an antioxidant containing sulfur gives more excellent improvement. The composition may further contain another thermoplastic resin and/or rubber elastomer, a polymer exhibiting compatibility with or affinity for SPS and having a polar group, and/or an inorganic filler in accordance with necessity.

4 Claims, No Drawings

POLYSTYRENIC RESIN COMPOSITION

TECHNICAL FIELD

The present invention relates to a polystyrenic resin composition which comprises a styrenic polymer having the syndiotactic configuration as the main component, and a molded article thereof. More particularly, the present invention relates to a polystyrenic resin composition which has excellent heat resistance, chemical resistance, and mechanical strength, and shows excellent heat stability, such as small decrease in mechanical strength and little discoloration, in heat molding at a relatively high temperature, and a molded article prepared by using this polystyrenic resin composition which shows excellent resistance to heat aging, such as small decrease in physical properties and little discoloration, after use at a high temperature for a long time.

BACKGROUND ART

Styrenic polymers having the syndiotactic configuration (hereinafter, referred to as SPS, occasionally) show excellent heat resistance, chemical resistance, and water resistance. Particularly, SPS has been widely used as the material for various types of molded article to which heat resistance is required because of the excellent heat resistance.

On the other hand, the temperature of heat molding of SPS is higher than conventional thermoplastic resins because of the proper characteristic of SPS. The temperature of the resin during the molding reaches about 300° C. A still higher temperature or a longer residence time in a heated apparatus is sometimes required depending on the condition of molding. When SPS is used singly, a problem arises under such a severe condition in that the resin is degraded by the action of heat and oxygen although SPS has the excellent heat resistance as described above, and a molded article showing decrease in physical properties, such as mechanical strength, and inferior appearance, such as discoloration, tends to be obtained.

Similarly, when a molded article prepared by the single use of SPS is exposed to the air for a long time at a high temperature, a problem arises in that the resin is degraded by the action of heat and oxygen, and the molded article tends to show decrease in physical properties, such as mechanical strength, and inferior appearance, such as discoloration.

For solving the above problems, the present inventors have proposed a resin composition comprising SPS which additionally contains a phenolic antioxidant (Japanese Patent Application No. Heisei 5(1993)-289,290) and a resin composition comprising SPS which additionally contains a phenolic antioxidant and an antioxidant containing sulfur (Japanese Patent Application No. Heisei 6(1994)-384). However, the above problems have not been solved sufficiently.

DISCLOSURE OF THE INVENTION

In the above circumstances, the present inventors studied intensively to develop a resin composition comprising SPS which shows improved heat stability with respect to mechanical properties, appearance, and color in heat molding at a high temperature while the excellent characteristics of SPS are maintained, and a molded article of SPS which shows improved resistance to heat aging with respect to mechanical properties, appearance, and color after use in the air at a high temperature for a long time.

As the result of the above studies, it was found that the above object can be achieved by adding a combination of a phenolic antioxidant and an antioxidant containing phosphorus or a combination of a phenolic antioxidant, an antioxidant containing phosphorus, and an antioxidant containing sulfur to SPS or to a resin comprising SPS and other resins where desired. The present invention was completed based on this knowledge.

Accordingly, the present invention provides a resin composition which is represented by following Polystyrenic resin compositions 1 to 6, and a molded articles prepared by using any of these resin compositions.

[Polystyrenic Resin Composition 1]

A polystyrenic resin composition which comprises 100 parts by weight of (A) (a-1) a styrenic polymer having the syndiotactic configuration, 0.005 to 5.0 parts by weight of (B) a phenolic antioxidant, and 0.005 to 5.0 parts by weight of an antioxidant containing phosphorus.

[Polystyrenic Resin Composition 2]

A polystyrenic resin composition which comprises 100 parts by weight of (A) a resin comprising 1 to 99% by weight of (a-1) a styrenic polymer having the syndiotactic configuration and 99 to 1% by weight of (a-2) a thermoplastic resin and/or a rubbery elastomer; 0.005 to 5.0 parts by weight of (B) a phenolic antioxidant; and 0.005 to 5.0 parts by weight of (C) an antioxidant containing phosphorus.

[Polystyrenic Resin Composition 3]

A polystyrenic resin composition comprising 100 parts by weight of (A) a resin comprising 99.9 to 90.0% by weight of (a-1) a styrenic polymer having the syndiotactic configuration and 0.1 to 10.0% by weight of (a-3) a polymer exhibiting compatibility with or affinity for component (a-1) and having a polar group; 0.005 to 5.0 parts by weight of (B) a phenolic antioxidant; and 0.005 to 5.0 parts by weight of (C) an antioxidant containing phosphorus.

[Polystyrenic Resin Composition 4]

A polystyrenic resin composition which comprises 100 parts by weight of (A) a resin obtained by mixing 100 parts by weight of a resin comprising 1 to 99% by weight of (a-1) a styrenic polymer having the syndiotactic configuration and 99 to 1% by weight of (a-2) a thermoplastic resin and/or a rubbery elastomer with 0.1 to 10.0 parts by weight of (a-3) a polymer exhibiting compatibility with or affinity for component (a-1) and having a polar group; 0.005 to 5.0 parts by weight of (B) a phenolic antioxidant; and 0.005 to 5.0 parts by weight of (C) an antioxidant containing phosphorus.

[Polystyrenic Resin Compositions 1 to 4]

Above Polystyrenic resin compositions 1 to 4, wherein the phenolic antioxidant of component (B) is preferably represented by general formula (I) which is shown later; and the antioxidant containing phosphorus of component (C) is preferably represented by general formula (II) which is shown later.

[Polystyrenic Resin Composition 5]

A polystyrenic resin composition which comprises 100 parts by weight of the resin of component (A) described in any of 1 to 4, 0.005 to 5.0 parts by weight of (B) a phenolic antioxidant, 0.005 to 5.0 parts by weight of (C) an antioxidant containing phosphorus, and 0.005 to 5.0 parts by weight of (D) an antioxidant containing sulfur.

Above Polystyrenic resin composition 5, wherein the phenolic antioxidant of component (B) is preferably represented by general formula (I) which is shown later; the antioxidant containing phosphorus of component (C) is preferably represented by general formula (II) which is shown later; and the antioxidant containing sulfur of component (D) is preferably represented by general formula (III) which is shown later.

[Polystyrenic Resin Composition 6]

A polystyrenic resin composition which comprises 100 parts by weight of any of Polystyrenic resin compositions 1 to 5 and 1 to 350 parts by weight of (E) an inorganic filler.

[A Molded Article of a Polystyrenic Resin Composition]

A molded article which is prepared by using any of Polystyrenic resin compositions 1 to 6.

THE MOST PREFERRED EMBODIMENT TO CARRY OUT THE INVENTION

The resin of component (A) used in the polystyrenic resin composition of the present invention comprises (a-1) a styrenic resin having the syndiotactic configuration as the essential component and at least one of (a-2) a thermoplastic resin and/or a rubbery elastomer and (a-3) a polymer exhibiting compatibility with or affinity for component (a-1) and having a polar group as the optional component. Therefore, one of components (a-2) and (a-3) alone may be comprised, or both may be comprised.

The syndiotactic configuration of SPS of component (a-1) means that the stereochemical structure has a highly syndiotactic configuration. In other words, phenyl groups and substituted phenyl groups of the side groups are alternately placed at the opposite positions with respect to the main chain formed with the carbon-carbon bonds. The tacticity in the stereochemical structure is quantitatively determined by the measurement of the nuclear magnetic resonance using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. In the present invention, "the styrenic polymer having the syndiotactic configuration" means polystyrene, a poly(alkylstyrene), a poly(halogenated styrene), a poly(halogenated alkylstyrene), a poly(alkoxystyrene), a poly(vinylbenzoic acid ester), a hydrogenated derivative of these polymers, a mixture of these polymers, or a copolymer containing constituting units of these polymers as the main components, which generally has the syndiotacticity of 75% or more, preferably 85% or more, expressed in terms of the content of the racemic diad, or 30% or more, preferably 50% or more, expressed in terms of the content of the racemic pentad.

Examples of the poly(alkylstyrene) include poly (methylstyrene), poly(ethylstyrene), poly(isopropylstyrene), poly(tertiary-butylstyrene), poly(phenylstyrene), poly (vinylnaphthalene), and poly(vinylstyrene). Examples of the poly(halogenated styrene) include poly(chlorostyrene), poly (bromostyrene), and poly(fluorostyrene). Examples of the poly-(halogenated alkylstyrene) include poly (chloromethylstyrene). Examples of the poly(alkoxystyrene) include poly(methoxystyrene) and poly(ethoxystyrene).

Particularly preferable examples of SPS described above include polystyrene, poly(p-methylstyrene), poly(m-methylstyrene), poly(p-tertiary-butylstyrene), poly(p-chlorostyrene), poly(m-chlorostyrene), poly(p-fluorostyrene), hydrogenated polystyrene, and copolymers containing constituting units of the above polymers.

The above styrenic polymer can be used singly or as a combination of two or more types.

The molecular weight of the styrenic polymer is not particularly limited. The weight-average molecular weight is preferably 10,000 or more, more preferably 50,000 or more.

When the weight-average molecular weight is less than 10,000, properties under heating and mechanical properties of the obtained composition or the molded products obtained from the composition are occasionally decreased, and such a weight-average molecular weight is not preferable.

The molecular weight distribution is not particularly limited, and SPS having various molecular weight distribution can be used.

SPS can be produced by polymerizing a styrenic monomer (a monomer corresponding to the repeating unit in SPS) in an inert hydrocarbon solvent or in the absence of solvents by using a titanium compound and a condensation product of water and trialkylaluminum as the catalyst (Japanese Patent Application Laid-Open No. Showa 62(1987)-187, 708). The above poly(halogenated alkylstyrene) can be produced in accordance with the process described in the specification of Japanese Patent Application Laid-Open No. Heisei 1(1989)-46,912, and the above hydrogenated derivative of the polymer described above can be produced in accordance with the process described in the specification of Japanese Patent Application Laid-Open No. Heisei 1(1989)-178,505.

Component (a-2) is a thermoplastic resin and/or a rubbery elastomer. As the thermoplastic resin of component (a-2), any thermoplastic resin can be used except thermoplastic resins used as component (a-1) described above or component (a-3) described later.

Examples of the thermoplastic resin of component (a-2) include styrenic polymers, such as polystyrene having the atactic configuration, polystyrene having the isotactic configuration, AS resins, and ABS resins; polyester resins, such as polyethylene terephthalate, polyethylene naphthalate, and polycarbonates; poly(thio)ether resins, such as polyphenylene ether, polyphenylene sulfide, and polyoxymethylene; sulfonic resins, such as polysulfone and polyether sulfone; acrylic resins, such as polyacrylic acid, polyacrylic esters, and polymethyl methacrylate; olefinic polymers, such as polyethylene, polypropylene, polybutene, poly-4-methylpentene-1, and ethylene-propylene copolymer; polymers containing a halogen, such as polyvinyl chloride, polyvinylidene chloride, and polyvinylidene fluoride; and polyamide resins.

Examples of the rubbery elastomer of component (a-2) include natural rubber, polybutadiene, polyisoprene, polyisobutylene, neoprene, polysulfide rubber, thiikol rubber, acrylic rubber, urethane rubber, silicone rubber, epichlorohydrin rubber, styrene-butadiene block copolymer (SBR), hydrogenated styrene-butadiene copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), styrene-butadiene random copolymer, hydrogenated styrene-butadiene random copolymer, styrene-ethylene-propylene random copolymer, styrene-ethylene-butylene random copolymer, ethylene-propylene rubber (EPR), ethylene-propylene-diene rubber (EPDM), core-shell type particulate elastomers, such as butadiene-acrylonitrile-styrene core-shell rubber (ABS), methyl methacrylate-butadiene-styrene core-shell rubber (MBS), methyl methacrylate-butyl acrylate-styrene core-shell rubber (MAS), octyl acrylate-butadiene-styrene core-shell rubber (MABS), an alkyl acrylate-butadiene-acrylonitrile-styrene core-shell rubber (AABS), butadiene-styrene core-shell rubber (SBR), and core-shell rubbers containing siloxane such as methyl methacrylate-butyl acrylate-siloxane, and rubbers obtained by modification of these rubbers.

Among these rubbers, SBR, SBS, SEB, SEBS, SIR, SEP, SIS, SEPS, core-shell rubbers, and rubbers obtained by modification of these rubbers are preferably used.

The thermoplastic resin and the rubbery elastomer each may be used as component (a-2) singly or as a combination of two or more types. The thermoplastic resin and the rubbery elastomer may be used in combination. In this case, one or more types may be selected from each of the thermoplastic resin and the rubbery elastomer and used in combination in accordance with desire.

Component (a-3) is a polymer exhibiting compatibility with or affinity for component (a-1) and having a polar group. This polymer has sequences exhibiting compatibility with or affinity for component (a-1) in the molecule. Examples of such a polymer include polymers having syndiotactic polystyrene, atactic polystyrene, isotactic polystyrene, a styrenic polymer, polyphenylene ether, or polyvinyl methyl ether as the main chain, block chains, or graft chains.

The above polar group may be any group as long as the group enhances adhesion to inorganic fillers. Examples of such a group include acid anhydride groups, carboxylic acid group, carboxylic acid ester groups, carboxylic acid halide groups, carboxylic acid amide group, carboxylic acid salt groups, sulfonic acid group, sulfonic acid ester groups, sulfonic acid chloride group, sulfonic acid amide group, sulfonic acid salt groups, epoxy group, amino group, imido group, and oxazoline group.

Specific examples of component (a-3) include modified styrenic polymers, such as styrene-maleic anhydride copolymer (SMA), styrene-glycidyl methacrylate copolymer, polystyrene modified with a carboxylic acid at the ends, polystyrene modified with epoxy group at the ends, polystyrene modified with oxazoline group at the ends, polystyrene modified with amine group at the ends, sulfonated polystyrenes, styrenic ionomers, styrene-methyl methacrylate graft polymer, (styrene-glycidyl methacrylate)-methyl methacrylate graft polymer, acrylate-styrene graft polymers modified with an acid, (styrene-glycidyl methacrylate)-styrene graft polymer, polybutylene terephthalate-polystyrene graft polymer, SPS modified with maleic anhydride, SPS modified with fumaric acid, SPS modified with glycidyl methacrylate, and SPS modified with an amine; and modified polyphenylene ether polymers, such as (styrene-maleic anhydride)-polyphenylene ether graft polymer, polyphenylene ether modified with maleic anhydride, polyphenylene ether modified with fumaric acid, polyphenylene ether modified with glycidyl methacrylate, and polyphenylene ether modified with an amine. Among these compounds, modified polyphenylene ethers and modified SPS are preferable.

The above polymers may be used singly or as a combination of two or more types.

The modified polyphenylene ether which is used as component (a-3) is a polymer obtained by modifying a conventional polyphenylene ether with a modifier. The method of modification is not limited as long as the modified product can be used in accordance with the object of the present invention.

The polyphenylene ethers are known compounds and described in the specifications of U.S. Pat. Nos. 3,306,874, 3,306,875, 3,257,357, and 3,257,358. Polyphenylene ethers can generally be produced by the oxidative coupling reaction forming homopolymers or copolymers in the presence of a copper-amine complex and one or more types of phenol which are substituted at two or three positions. As the copper-amine complex, a copper-amine complex derived from a primary, secondary, or tertiary amine can be used.

Examples of the polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4phenylene ether), poly(2-chloro-6-methyl-1,4-phenylene ether), poly(2-methyl-6-ethyl- 1,4-phenylene ether), poly(2,6-dibromo- 1,4-phenylene ether), poly(2,6-dichloro-1,4-phenylene ether), poly(2,6-diethyl-1,4-phenylene ether), and poly(2,6-dimethyl-1,4-phenylene ether).

Further examples of the suitable polyphenylene ether include copolymers, such as copolymers derived from two or more types of phenol which are used for preparation of the homopolymers described above. Still further examples of the suitable polyphenylene ether include graft copolymers and block copolymers derived from vinylaromatic compounds, such as polystyrene, and the polyphenylene ether described above.

Among these compounds, poly(2,6-dimethyl-1,4-phenylene ether) is particularly preferably used.

As the modifier used for modification of the polyphenylene ethers, compounds having an ethylenic double bond and a polar group in the same molecule are used. Examples of the modifier include maleic anhydride, maleic acid, fumaric acid, esters of maleic acid, esters of fumaric acid, maleimide, maleimide having substituents on N, salts of maleic acid, salts of fumaric acid, acrylic acid, esters of acrylic acid, acrylamide, salts of acrylic acid, methacrylic acid, esters of methacrylic acid, methacrylamide, salts of methacrylic acid, and glycidyl methacrylate. Among these modifiers, maleic anhydride, fumaric acid, and glycidyl methacrylate are particularly preferably used. The above modifier can be used singly or as a combination of two or more types.

The above modified polyphenylene ether can be obtained by bringing the above polyphenylene ether and the above modifier into reaction with each other, for example, in the presence of a solvent or another resin. The process for the modification is not particularly limited, and a conventional process can be used. Examples of the conventional process include a process in which the reaction is allowed to proceed by melt kneading the above components at a temperature in the range of 150 to 350° C. using a roll mill, a Banbury mixer, an extruder, or the like and a process in which the reaction is allowed to proceed by heating the above components in a solvent, such as benzene, toluene, and xylene. In order to facilitate the reaction, it is effective that a radical generating agent, such as benzoyl peroxide, di-t-butyl peroxide, dicumyl peroxide, t-butyl peroxybenzoate, azobisisobutyronitrile, azobisisovaleronitrile, and 2,3-diphenyl-2,3-dimethylbutane, is present in the reaction system. Among these processes, the process in which the reaction is allowed to proceed by melt kneading the components in the presence of a radical generating agent is preferable.

As component (a-3), modified SPS having a polar group may also be used. The modified SPS can be obtained by modifying SPS described as component (a-1) in the above with a modifier. However, the process for obtaining the modified SPS is not limited to this process as long as the modified SPS can be used in accordance with the object of the present invention.

SPS used for the modification is not particularly limited, and the polymers described as component (a-1) in the above can be used. Among these polymers, a copolymer of styrene with a substituted styrene is preferably used from the standpoint of the compatibility with other components. The composition of the copolymer is not particularly limited. It is preferred that the content of the unit of the substituted styrene is 3 to 50% by mol. When the content is less than 3% by mol, the modification is difficult. When the content exceeds 50% by mol, the compatibility with other components is decreased. Therefore, such a content is not preferable. Examples of the particularly preferable substituted styrene include alkylstyrenes, such as methyl styrene, ethylstyrene, isopropylstyrene, tertiary-butylstyrene, and vinylstyrene; halogenated styrenes, such as chlorostyrene, bromostyrene, and fluorostyrene; halogenated alkylstyrenes, such as chloromethylstyrene; and alkoxystyrenes, such as methoxystyrene and ethoxystyrene. The substituted styrene can be used singly or as a combination of two or more types.

Polymers having the atactic configuration corresponding to the above SPS may also be used as long as the used amount is 5% by weight or less based on the amount of SPS. When the amount exceeds 5% by weight, the heat resistance of the composition is decreased, and such an amount is not preferable.

As the modifier used for modification of SPS, compounds having an ethylenic double bond and a polar group in the same molecule can be used. Examples of the modifier include maleic anhydride, maleic acid, fumaric acid, esters of maleic acid, esters of fumaric acid, maleimide, maleimide having substituents on N, salts of maleic acid, salts of fumaric acid, acrylic acid, esters of acrylic acid, acrylamide, salts of acrylic acid, methacrylic acid, esters of methacrylic acid, methacrylamide, salts of methacrylic acid, and glycidyl methacrylate. Among these modifiers, maleic anhydride, fumaric acid, and glycidyl methacrylate are particularly preferably used. The above modifier can be used singly or as a combination of two or more types.

The above modified SPS can be obtained by bringing the above SPS and the above modifier into reaction with each other, for example, in the presence of a solvent or another resin. The process for the modification is not particularly limited, and a conventional process can be used. Examples of the conventional process include a process in which the reaction is allowed to proceed by melt kneading the above components at a temperature in the range of 150 to 350° C. using a roll mill, a Banbury mixer, an extruder, or the like and a process in which the reaction is allowed to proceed by heating the above components in a solvent, such as benzene, toluene, and xylene. In order to facilitate the reaction, it is effective that a radical generating agent, such as benzoyl peroxide, di-t-butyl peroxide, dicumyl peroxide, t-butyl peroxybenzoate, azobisisobutyronitrile, azobisisovaleronitrile, 2,3-diphenyl-2,3-dimethylbutane, or the like, is present in the reaction system. Among these processes, the process in which the reaction is allowed to proceed by melt kneading the components in the presence of a radical generating agent is preferable.

Among these modified SPS, SPS modified with maleic anhydride, SPS modified with fumaric acid, and SPS modified with glycidyl methacrylate are particularly preferably used.

The above compounds may be used as component (a-3) singly or as a combination of two or more types. The content of the polar group in component (a-3) is in the range of 0.01 to 20% by weight, preferably in the range of 0.05 to 10% by weight. When the content is less than 0.01% by weight, a large amount of component (a-3) is required for exhibiting the effect of the compatibilizer to decrease mechanical properties and heat resistance of the composition. When the content exceeds 20% weight, the compatibility with component (a-1) is decreased. Therefore, such a content is not preferable.

The content of component (a-3) is selected in the range of 0.1 to 10% by weight, preferably in the range of 0.5 to 8% by weight, based on the total weight of the resin components. When the content is less than 0.1% by weight, the effect of improving the toughness is not sufficient. When the content exceeds 10% by weight, heat resistance and the property for molding are decreased. Therefore, such a content is not preferable.

In the resin composition of the present invention, the heat resistance of SPS or the resin composition containing SPS with respect to mechanical properties, appearance, and color in heat molding can be improved by adding a phenolic antioxidant of component (B) and an antioxidant containing phosphorus of component (C) in combination while the excellent proper characteristics of SPS are maintained. Moreover, the resistance to heat aging of a molded article prepared by using the above resin with respect to the same properties after use in the air for a long time can be improved. When an antioxidant containing sulfur of component (D) is used in addition to the above components, a still more excellent effect of preventing oxidation can be obtained, and heat stability or resistance to heat aging in heat molding or after use in the air at a high temperature for a long time can be improved still more.

The type of the phenolic antioxidant of component (B) is not particularly limited. Examples of the phenolic antioxidant include 2,6-di-t-butyl-4-methylphenol, 2,6-di-t-butyl-4-ethylphenol, 2,6-di-t-butyl-4-phenylphenol, 2,2'-methylene-bis(4-methyl-6-t-butylphenol), 2,2'-methylene-bis(4-ethyl-6-t-butylphenol), 2,2'-methylene-bis(4-ethyl-6-n-nonylphenol), 4,4'-butylidene-bis(3-methyl-6-t-butylphenol), 4,4'-thiobis(3-methyl-6-t-butylphenol), 1,1,3-tris(5-t-butyl-4-hydroxy-2-methylphenyl)butane, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, n-octadecyl-3-(3,5-di-t-butyl-4-hydroxyphenyl)propionate, 3,5-di-t-butyl-4-hydroxybenzyl phosphonate diethyl ester, triethylene glycol bis[3-(3-t-butyl-5-methyl-4-hydroxyphenyl)propionate], 1,6-hexanediol-bis[3-(3,5-di-t-butyl-4-hydroxyphenyl) propionate], 2,2-thiodiethylene-bis[3-(3,5-di-t-butyl-4-hydroxyphenyl)propionate], N,N-hexamethylene-bis(3,5-di-t-butyl-4-hydroxyhydrocinnamide), 3,9-bis[1,1-dimethyl-2-(β-(3-t-butyl-4-hydroxy-5-methylphenyl) propionyloxy]ethyl]-2,4,8,10-tetraoxaspiro[5,5]undecane, N,N'-bis[3-(3,5-di-t-butyl-4-hydroxyphenyl)-propionyl] hydrazine, pentaerythrityl-tetrakis[3-(3,5-di-t-butyl-4-hydroxyphenyl)propionate], 2,4-bis(n-octylthio)-6-(4- hydroxy-3,5-di-t-butylanilino)-1,3,5-triazine, 1,3,5-trimethyl-2,4,6-tris(3,5-di-t-butyl-4-hydroxybenzyl) benzene, tris(3,5-di-t-butyl-4-hydroxybenzyl)isocyanurate, and tris(4-t-butyl-2,6-dimethyl-3-hydroxybenzyl) isocyanurate. Among these phenolic antioxidants, compounds represented by general formula (I) are particularly preferable;

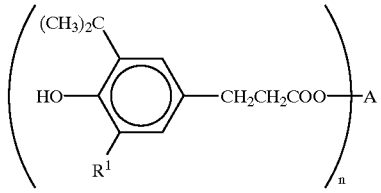

wherein $R^1$ represents methyl group or t-butyl group, A represents a residue group obtained by eliminating n hydroxyl groups from an alcohol having 1 to 4 hydroxyl groups, and n represents an integer of 1 to 4.

The type of the antioxidant containing phosphorus is not particularly limited. Examples of the antioxidant containing phosphorus include di(nonylphenyl)pentaerythritol diphosphite, phenyl-bisphenol A pentaerythritol diphosphite, distearyl pentaerythritol diphosphite, dioctyl pentaerythritol diphosphite, dilauryl pentaerythritol diphosphite, diphenyl pentaerythritol diphosphite, dicyclohexyl pentaerythritol diphosphite, bis(2,4-di-t-butylphenyl) pentaerythritol diphosphite, bis(2,6-di-t-butyl-4-methylphenyl)pentaerythritol diphosphite, bis(2,4,6-tri-t-butylphenyl)pentaerythritol diphosphite, tetrakis(2,4-di-t-butylphenyl)-4,4'-biphenylene phosphonite, 2,2'-ethylidene-bis(4,6-di-t-butylphenyl)fluorophosphite, 2,2'-methylene-bis(4,6-di-t-butylphenyl)octyl phosphite, 9,10-dihydro-9-oxa-10-phosphaphenanthrene-10-oxide, tris(isodecyl) phosphite, tris(tridecyl)phosphite, phenyl diisooctyl phosphite, phenyl diisodecyl phosphite, phenyl di(tridecyl) phosphite, diphenyl isooctyl phosphite, diphenyl isodecyl phosphite, diphenyl tridecyl phosphite, triphenyl phosphite, tris(2,4-di-t-butylphenyl)phosphite, tris(mononoylphenyl) phosphite, tris(mono, dinonylphenyl)phosphite, 4,4'-isopropylidene diphenol tetraalkyl diphosphites having alkyl groups having 12 to 15 carbon atoms, 4,4'-butylidene-bis(3-methyl-6-t-butylphenyl-di-tridecyl)phosphite, and 1,1,3-tris (2-methyl-4-di-tridecyl phosphite-5-t-butylphenyl)butane. Among these compounds, compounds represented by general formula (II) are preferable:

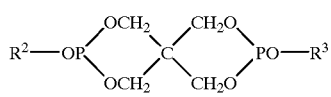

(II)

wherein $R^2$ and $R^3$ each independently represents an alkyl group, an aryl group, or an alkylaryl group. Compounds represented by general formula (II) in which $R^2$ and $R^3$ each represents an alkylaryl group are more preferable.

The type of the antioxidant containing sulfur of component (D) of the present invention is not particularly limited. Examples of the antioxidant containing sulfur include dilauryl 3,3'-thiodipropionate, ditridecyl 3,3'-thiodipropionate, dimyristyl 3,3'-thiodipropionate, distearyl 3,3'-thiodipropionate, distearyl 3,3'-methyl-3,3'-thiodipropionate, bis-2-methyl-4-(3-n-alkyl($C_{12}$ or $C_{14}$) thiopropionyloxy)-5-t-butylphenyl sulfides, terakis [methylene 3-(hexylthio)propionate]methane, tetrakis [methylene 3-(dodecylthio)propionate]methane, tetrakis [methylene 3-(octadecylthio)propionate]methane, 2,2'-thiodiethylene-bis[3-(3,5-di-t-butyl-4-hydroxyphenyl) propionate], 4,4'-thiobis(3-methyl-6-t-butylphenol], 2-mercaptobenzimidazole, and 2-mercaptomethylbenzimidazole. Among these compounds, compounds represented by general formula (III) are preferable:

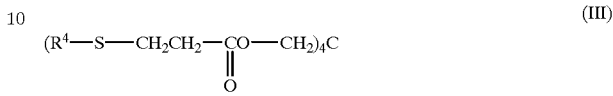

(III)

wherein $R^4$ represents an alkyl group having 6, 12, or 18 carbon atoms. Compounds represented by general formula (III) in which $R^4$ represents an alkyl group having 12 carbon atoms are more preferable from the standpoint of heat stability and oxidation stability.

The phenolic antioxidant of component (B), the antioxidant containing phosphorus of component (C), and the antioxidant containing sulfur of component (D) each may be used singly or as a combination of two or more types.

In the present invention, components (B) and (C) are used in combination as the antioxidants. When components (B) and (C) are used in combination with component (D), a more excellent effect can be obtained by using a compound represented by general formula (I) as component (B), a compound represented by general formula (II) as component (C), and a compound represented by general formula (III) as component (D).

The inorganic filler used in the present invention may have various shapes, such as fiber, granules, powder, and the like.

As the filler having the shape of fiber, glass fiber, carbon fiber, wiskers, ceramic fiber, metal fibers, and the like can be used. Specific examples of the filler having the shape of fiber include wiskers, such as boron wisker, alumina wisker, silica wisker, silicon carbide wisker; ceramic fibers, such as gypsum fiber, potassium titanate fiber, magnesium sulfate fiber, and magnesium oxide fiber; and metal fibers, such as copper fiber, aluminum fiber, and steel fiber.

As for the form of the filler having the shape of fiber, the filler may have a form of a cloth, a mat, a cut bundle, short fibers, filaments, or wiskers. When the filler has the form of a cloth or a mat, the length is preferably 1 mm or more, more preferably 5 mm or more. When the filler has the form of cut bundles, it is preferred that the length is 0.05 to 50 mm and the diameter of a fiber is 5 to 20 µm.

Examples of the filler having a shape of granules or powder include talc, carbon black, graphite, titanium dioxide, silica, mica, calcium carbonate, calcium sulfate, barium carbonate, magnesium carbonate, magnesium sulfate, barium sulfate, oxysulfate, tin oxides, alumina, kaolin, silicon carbide, metal, and glass. Among these fillers, fillers of glass are preferable, and, as for the shape, glass filament, glass fiber, glass roving, glass mat, glass powder, glass flakes, and glass beads, are particularly preferable.

The inorganic filler may be used singly or as a combination of two or more types.

As the inorganic filler of component (E), an inorganic filler treated, for example, with a coupling agent on the surface for enhancing adhesion with SPS of component (A) (a-1) is preferably used. As the coupling agent, for example, a silane coupling agent or a titanium coupling agent is used. Specific examples of the silane coupling agent include triethoxysilane, vinyl tris(β-methoxyethoxy)silane, γ-methacryloxypropyl trimethoxysilane, γ-glycidoxypropyl trimethoxy-silane, β-(1,1-epoxycyclohexyl)ethyl trimethoxysilane, N-β-(aminoethyl)-γ-aminopropyl trimethoxysilane, N-β-(aminoethyl)-γ-aminopropyl methyl dimethoxysilane, γ-aminopropyl triethoxysilane, N-phenyl-γ-aminopropyl trimethoxysialne, γ-mercaptopropyl trimethoxysilane, γ-chloropropyl trimethoxysilane, γ-aminopropyl trimethoxysilane, γ-aminopropyl-tris(2-methoxyethoxy)silane, N-methyl-γ-aminopropyl trimethoxysilane, N-vinylbenzyl-γ-aminopropyl triethoxysilane, triaminopropyl trimethoxysilane, 3-ureydopropyl trimethoxysilane, 3-4,5-dihydroimidazolpropyl triethoxysilane, hexamethyl disilazane, N,O-(bistrimethylsilyl)amide, and N,N-bis (trimethylsilyl)urea. Among these compounds, aminosilanes and epoxysilanes, such as γ-aminopropyltrimethoxysilane, N-β-(aminoethyl)-γ-aminopropyl trimethoxysilane, γ-glycidoxypropyl trimethoxysilane, and β-(3,4-epoxycyclohexyl)ethyl trimethoxysilane, are particularly preferable.

Specific examples of the titanium coupling agent include isopropyl triisostearoyl titanate, isopropyl tridodecylbenzenesulfonyl titanate, isopropyl tris(dioctyl pyrophosphate) titanate, tetraisopropyl bis(dioctyl -phosphite)titanate, tetraoctyl bis(ditridecyl phosphite)titanate, tetra(1,1-diallyloxymethyl-1-butyl)bis(ditridecyl)phosphite titanate, bis(dioctyl pyrophosphate)oxyacetate titanate, bis(dioctyl pyrophosphate)ethylene titanate, isopropyl trioctanoyl titanate, isopropyl dimethacryl isostearoyl titanate, isopropyl isostearoyl diacryl titanate, isopropyl tri(dioctyl phosphate)titanate, isopropyl tricumyl phenyl titanate, isopropyl tri(N-amidoethyl, aminoethyl)titanate, dicumyl phenyloxy acetate titanate, and diisostearoyl ethylene titanate. Among these compounds, isopropyl tri(N-amidoethyl, aminoethyl)titanate is preferable.

The surface treatment of the above filler by using the above coupling agent can be conducted in accordance with a conventional process, and the process for the surface treatment of the inorganic filler used in the present invention is not particularly limited. A suitable process can be selected in accordance with the shape of the filler, for example, from the sizing treatment in which the filler is coated with a solution of the above coupling agent in an organic solvent or with a suspension of the above coupling agent, i.e., with the so-called sizing agent, the dry mixing process using a Henschel mixer, a super mixer, a Redige mixer, or a V-type mixer, the spraying process, the integral blending process, and the dry concentrate process. The sizing treatment, the dry mixing process, and the spraying process are preferable among these processes.

A film forming substance for glass may be used in combination with the above coupling agent. The film forming substance is not particularly limited. Examples of the film forming substances include polymers such as polyesters, polyurethanes, epoxy polymers, acrylic polymers, vinyl acetate polymers, and polyethers.

In the present invention, organic filler may be used in addition to the above inorganic filler of component (E). Examples of the organic filler include organic synthetic fibers and natural plant fibers. Specific examples of the organic synthetic fiber include all aromatic polyamide fibers and polyimide fibers.

In the resin composition of the present invention, various types of additional components, such as nucleating agents, plasticizers, mold release agents, flame retardants, antistatic agents, foaming agents, pigments, carbon black, processing auxiliary agents, and metal soaps may be comprised within the range that the object of the present invention is not adversely affected.

Polystyrenic resin composition 1 of the present invention is a three-compenent resin composition obtained by adding components (B) and (C) to a resin of component (A) comprising component (a-1). The amounts of the components are as follows: The amount of the phenolic antioxidant of component (B) is 0.005 to 5.0 parts by weight, preferably 0.01 to 3.0 parts by weight, more preferably 0.05 to 1.0 parts by weight, per 100 parts by weight of the resin of component (A) comprising component (a-1). The amount of the antioxidant containing phosphorus of component (C) is 0.005 to 5.0 parts by weight, preferably 0.01 to 3.0 parts by weight, more preferably 0.05 to 1.0 parts by weight, per 100 parts by weight of the resin of component (A) comprising component (a-1).

When any of the amounts of components (B) and (C) is less than 0.005 parts by weight, a sufficient effect of preventing oxidation is not obtained, and heat resistance and durability of the resin composition and the molded article are not increased sufficiently. When any of these amounts exceeds 5.0 parts by weight, the amount is economically disadvantageous, and problems, such as bleeding of the antioxidants and deterioration in mechanical strength, heat resistance, and appearance, arise. Therefore, such an amount is not preferable.

Polystyrenic resin composition 2 of the present invention is a four-compenent resin composition obtained by adding components (B) and (C) to a resin of component (A) comprising components (a-1) and (a-2). The amounts of the components are as follows: The resin of component (A) comprises 1 to 99% by weight, preferably 5 to 95% by weight, more preferably 20 to 80% by weight, of SPS of component (a-1) and 99 to 1% by weight, preferably 95 to 5% by weight, more preferably 80 to 20% by weight, of a thermoplastic resin and/or a rubbery elastomer of component (a-2). The amount of the phenolic antioxidant of component (B) is 0.005 to 5.0 parts by weight, preferably 0.01 to 3.0 parts by weight, more preferably 0.05 to 1.0 parts by weight, per 100 parts by weight of the resin of component (A). The amount of the antioxidant containing phosphorus of component (C) is 0.005 to 5.0 parts by weight, preferably 0.01 to 3.0 parts by weight, more preferably 0.05 to 1.0 parts by weight, per 100 parts by weight of the resin of component (A). When the amount of component (a-2) is less than 1% by weight, the effect of improving physical properties which is expected by the addition of component (a-2) is not obtained. When the amount of component (a-2) exceeds 99% by weight, a problem arises in that the excellent properties derived from SPS, such as excellent mechanical strength and heat resistance, are not sufficiently expected.

The amounts of components (B) and (C) are specified by the same reasons as those described for Polystyrenic resin composition 1.

Polystyrenic resin composition 3 of the present invention is a four-compenent resin composition obtained by adding components (B) and (C) to a resin of component (A) comprising components (a-1) and (a-3). The amounts of the components are as follows: The resin of component (A) comprises 99.9 to 90.0% by weight, preferably 99.5 to 92.0% by weight, of SPS of component (a-1) and 0.1 to 10.0% by weight, preferably 0.5 to 8.0% by weight, of a polymer exhibiting compatibility with or affinity for component (a-1) and having a polar group of component (a-3). The amount of the phenolic antioxidant of component (B) is 0.005 to 5.0 parts by weight, preferably 0.01 to 3.0 parts by weight, more preferably 0.05 to 1.0 parts by weight, per 100 parts by weight of the resin of component (A). The amount of the antioxidant containing phosphorus of component (C) is 0.005 to 5.0 parts by weight, preferably 0.01 to 3.0 parts by weight, more preferably 0.05 to 1.0 parts by weight, per 100 parts by weight of the resin of component (A).

When the amount of component (a-3) is less than 0.1% by weight, the effect of improving toughness which is expected by the addition of component (a-3) is insufficient. When the amount of component (a-3) exceeds 10.0% by weight, heat resistance and the property for molding of the obtained composition deteriorate.

The amounts of components (B) and (C) are specified by the same reasons as those described for Polystyrenic resin composition 1.

Polystyrenic resin composition 4 of the present invention is a five-compenent resin composition obtained by adding components (B) and (C) to a resin of component (A) comprising components (a-1), (a-2), and (a-3). The amounts of the components are as follows: The resin of component (A) is obtained by adding 0.1 to 10.0 parts by weight, preferably 0.5 to 8.0 parts by weight, of a polymer exhibiting compatibility with or affinity for component (a-1) and having a polar group of component (a-3) to 100 parts by weight of a resin composition which comprises 1 to 99% by weight, preferably 5 to 95% by weight, more preferably 20 to 80% by weight, of SPS of component (a-1) and 99 to 1% by weight, preferably 95 to 5% by weight, more preferably 80 to 20% by weight, of a thermoplastic resin and/or a rubbery elastomer of component (a-2). The amount of the phenolic antioxidant of component (B) is 0.005 to 5.0 parts by weight, preferably 0.01 to 3.0 parts by weight, more preferably 0.05 to 1.0 parts by weight, per 100 parts by weight of the resin of component (A). The amount of the antioxidant containing phosphorus of component (C) is 0.005 to 5.0 parts by weight, preferably 0.01 to 3.0 parts by weight, more preferably 0.05 to 1.0 parts by weight, per 100 parts by weight of the resin of component (A).

The amount of component (a-2) is specified by the same reasons as those described for Polystyrenic resin composition 2.

The amount of component (a-3) is specified by the same reasons as those described for Polystyrenic resin composition 3, i.e., when the amount of component (a-3) is less than 0.1 part by weight, the effect of improving toughness which is expected by the addition of component (a-3) is insufficient. When the amount of component (a-3) exceeds 10.0 parts by weight, heat resistance and the property for molding of the obtained composition deteriorate.

The amounts of components (B) and (C) are specified by the same reasons as those described for Polystyrenic resin composition 1.

Polystyrenic resin composition 5 of the present invention is a four- to six-component resin composition obtained by adding components (B), (C), and (D) to the resin of component (A) used in any of Polystyrenic resin compositions 1 to 4 described above.

The amounts of the components are as follows: The amount of the phenolic antioxidant of component (B) is 0.005 to 5.0 parts by weight, preferably 0.01 to 3.0 parts by weight, more preferably 0.05 to 1.0 parts by weight, per 100 parts by weight of the resin of component (A). The amount of the antioxidant containing phosphorus of component (C) is 0.005 to 5.0 parts by weight, preferably 0.01 to 3.0 parts by weight, more preferably 0.05 to 1.0 parts by weight, per 100 parts by weight of the resin of component (A). The amount of the antioxidant containing sulfur of component (D) is 0.005 to 5.0 parts by weight, preferably 0.01 to 3.0 parts by weight, more preferably 0.05 to 1.0 parts by weight, per 100 parts by weight of the resin of component (A).

When the amount of component (D) is less than 0.005 parts by weight, the more excellent effect of preventing oxidation expected by the addition of component (D) is not obtained. When the amount of component (D) exceeds 5.0 parts by weight, the amount is economically disadvantageous, and bleeding of the antioxidant and deterioration in mechanical strength, heat resistance, and appearance arise. Therefore, such an amount is not preferable.

Polystyrenic resin composition 6 of the present invention is a five- to seven-component resin composition obtained by adding component (E) to any of Polystyrenic resin compositions 1 to 5 described above.

The amount of the inorganic filler of component (E) is 1 to 350 parts by weight, preferably 5 to 200 parts by weight, per 100 parts by weight of the composition selected from Polystyrenic resin compositions 1 to 5.

When the amount of component (E) is less than 1 part by weight, a sufficient effect of improving heat resistance, rigidity, and impact strength is not found. When the amount exceeds 350 parts by weight, dispersion becomes inferior to cause difficulty in molding.

The polystyrenic resin composition of the present invention can be obtained by mixing the components in relative amounts described above. The method of mixing is not particularly limited, and conditions of mixing, such as the order of addition and the method of addition, can be decided as desired.

The polystyrenic resin composition of the present invention includes a resin composition obtained by mixing the components, followed by melt kneading of the obtained mixture.

The resin composition obtained by additional melt kneading is more suitable as the material for molding than the material obtained simply by mixing. The method of melt kneading is not particularly limited, and a conventional method can be used.

The resin composition of the present invention which is produced as described above shows less tendency to have degradation, such as decrease in mechanical strength and deterioration in color, even when the composition is molded and processed at a relatively high temperature.

The resin composition of the present invention can be used as the material of molded articles. The molded articles produced by using the resin composition of the present invention show very small change in physical properties even after the articles are used in the air at a high temperature for a long time.

The resin composition of the present invention can be molded in accordance with various conventional processes for molding plastics, such as the injection molding, the extrusion molding, and the blow molding. Procedures and conditions of the molding are not particularly limited and can suitably be decided in accordance with the constitution of the used resin composition and the article to be produced.

The present invention is described in detail with reference to examples and comparative examples in the following.

To evaluate test pieces obtained in the examples and the comparative examples described later with respect to heat resistance in molding at a high temperature and heat resistance (resistance to heat aging) after use at a high temperature for a long time after molding, the following measurements were conducted in accordance with the following methods.

(1) Heat Stability in Molding

The heat stability in molding was evaluated from physical properties after heat molding at a high temperature and before treatment at a high temperature (1-1) Tensile strength (MPa): the tensile strength was measured in accordance with the method of Japanese Industrial Standard K7113.

(1-2) YI: YI (yellow index) was measured in accordance with the method of Japanese Industrial Standard K7103.

(2) Resistance to Heat Aging

A test piece for the tensile test was heat treated in an oven at 160° C. for 1000 hours, and the resistance to heat aging was evaluated from the retention of the tensile strength (%) of the test piece calculated in accordance with the following equation:

retention of tensile strength (%)=(tensile strength after heat treatment)/(tensile strength before heat treatment)×100

(2-1) Tensile strength (MPa): The tensile strength was measured in accordance with the method of Japanese Industrial Standard K7113.

PREPARATION EXAMPLE 1

(Preparation of SPS)

Into a 2 liter reactor, 1.0 liter of purified styrene and 1 mmol of triethylaluminum were placed. After the mixture was heated to 80° C., 16.5 ml of a preliminary mixed catalyst [prepared from 90 micromol of pentamethyl cyclopentadienyl titanium trimethoxide, 90 micromol of dimethyl anilinium tetrakis(pentafluorophenyl)borate, 29.1 mmol of toluene, and 1.8 mmol of triisobutyl aluminum] was added, and the polymerization was allowed to proceed at 80° C. for 5 hours. After the reaction was completed, the product was washed repeatedly with methanol and dried to obtain 380 g of a polymer.

The molecular weight of the obtained polymer was measured by the gel permeation chromatography at 130° C. using 1,2,4-trichlorobenzene as the solvent and found to be 400,000. The ratio of the weight-average molecular weight to the number-average molecular weight was 2.60. By the measurements of the melting point and the $^{13}$C-NMR, the obtained polymer was confirmed to be SPS.

PREPARATION EXAMPLE 2

(Preparation of a modified polyphenylene ether)

Polyphenylene ether (inherent viscosity: 0.47 dl/g in chloroform at 25° C.) in amount of 1 kg, 60 g of maleic anhydride, and 10 g of 2,3-dimethyl-2,3-diphenylbutane (a product of Nippon Yushi Co., Ltd., trade name: Nofmer BC) as the radical generating agent were dry blended and then melt kneaded using a 30 mm twin-screw extruder at a rotation speed of screws of 200 rpm and a set temperature of 300° C. The temperature of the resin was about 330° C. The obtained strands were cooled and formed into pellets to obtain polyphenylene ether modified with maleic anhydride. To measure the degree of modification, 1 g of the obtained modified polyphenylene ether was dissolved into ethylbenzene and reprecipitated with methanol. The recovered polymer was extracted with methanol using a Soxhlet extractor. After the polymer was dried, the degree of modification of the polymer was obtained from the intensity of the carbonyl absorption in the measurement of the infrared spectrum and also from titration and found to be 2.0% by weight.

Trade names, companies of production, and chemical names of the antioxidants used in Examples and Comparative Examples are as follows:

(Phenolic Antioxidants)

Irganox 565 a product of Ciba Geigy Co.
2,4-bis(n-octylthio)-6-(4-hydroxy-3,5-di-t-butylanilino)-1,3,5-triazine Irganox 1330 a product of Ciba Geigy Co.
1,3,5-trimethyl-2,4,6-tris(3,5-di-t-butyl-4-hydroxybenzyl)benzene Cyanox 1790 a product of Cyanamide Co.
tris(4-t-butyl-2,6-dimethyl-3-hydroxybenzyl) isocyanurate Irganox 1076 a product of Ciba Geigy Co.
n-octadecyl 3-(3,5-di-t-butyl-4-hydroxylphenyl)-propionate Irganox 1010 a product of Ciba Geigy Co.
pentaerythrityl tetrakis[3-(3,5-di-t-butyl-4-hydroxylphenyl)propionate Irganox 245 a product of Ciba Geigy Co.
triethylene glycol bis[3-(3-t-butyl-5-methyl-4-hydroxyphenyl)propionate Irganox 259 a product of Ciba Geigy Co.
1,6-hexanediol bis[3-(3,5-di-t-butyl-4-hydroxyphenyl) propionate Adekastab AO-80 a product of Asahi Denka Co., Ltd.
3,9-bis[1,1-dimethyl-2-[β-(3-t-butyl-4-hydroxy-5-methylphenyl)propionyloxy]ethyl]-2,4,8,10-tetraoxaspiro[5,5]undecane Irganox 3114 a product of Ciba Geigy Co.
1,3,5-trimethyl-2,4,6-tris(3,5-di-t-butyl-4-hydroxybenzyl)benzene (Antioxidants Containing Phosphorus)

Sandostab P-EPQ a product of Sandoz Co.
tetrakis(2,4-di-t-butylphenyl)-4,4'-biphenylene phosphonite Irgafos 168 a product of Ciba Geigy Co.
tris(2,4-di-t-butylphenyl)phosphite Adekastab HP-10 a product of Asahi Denka Co., Ltd.
2,2'-methylenebis(4,6-di-t-butylphenyl)octyl phosphite Adekastab PEP-36 a product of Asahi Denka Co., Ltd.
bis(2,6-di-t-butyl-4-methylphenyl)-pentaerythritol diphosphite Adekastab PEP-24 a product of Asahi Denka Co., Ltd.
bis(2,4-di-t-butylphenyl)pentaerythritol diphosphite (Antioxidants Containing Sulfur)

Sumilizer TPM a product of Sumitomo Kagaku Kogyo Co., Ltd.
dimyristyl 3,3'-thiodipropionate Sumilizer TPL-R a product of Sumitomo Kagaku Kogyo Co., Ltd.
dilauryl 3,3'-thiodipropionate Sumilizer TPS a product of Sumitomo Kagaku Kogyo Co., Ltd.
distearyl 3,3'-thiodipropionate Sumilizer TP-D a product of Sumitomo Kagaku Kogyo Co., Ltd.
tetrakis[methylene 3-(dodecylthio)propionate]methane

EXAMPLES 1 TO 18 AND COMPARATIVE EXAMPLES 1 TO 5

In Examples 1 to 18 and Comparative Example 1 to 5 shown in Table 1A, antioxidants shown in Table 1A in amounts also shown in Table 1A were added to 100 parts by weight of SPS obtained in Preparation Example 1, and the components were dry blended by a Henschel mixer. The obtained mixture was melt kneaded by a twin-screw extruder at a resin temperature of 300° C. and formed into pellets. The obtained pellets were injection molded at a resin temperature of 300° C. to obtain test pieces. The heat stability was evaluated by using the obtained test pieces.

The results are shown in Table 1B.

TABLE 1A-1

| | Antioxidant | | | |
|---|---|---|---|---|
| | (B) phenolic antioxidant | | (C) antioxidant containing phosphorus | |
| | type | amount (part by wt.) | type | amount (part by wt.) |
| Example 1 | Irganox 565 | 0.5 | Sandostab P-EPQ | 0.5 |
| Example 2 | Irganox 1330 | 0.5 | Irgafos 168 | 0.5 |
| Example 3 | Cyanox 1790 | 0.5 | Irgafos 168 | 0.5 |
| Example 4 | Irganox 1076 | 0.5 | Irgafos 168 | 0.5 |
| Example 5 | Irganox 1076 | 0.5 | Adekastab HP-10 | 0.5 |
| Example 6 | Irganox 1010 | 0.5 | Irgafos 168 | 0.5 |
| Example 7 | Irganox 1010 | 0.5 | Sandostab P-EPQ | 0.54 |
| Example 8 | Irganox 245 | 0.5 | Adekastab PEP-36 | 0.5 |
| Example 9 | Irganox 259 | 0.5 | Adekastab PEP-36 | 0.5 |
| Example 10 | Irganox 1010 | 0.5 | Adekastab PEP-24 | 0.5 |
| Example 11 | Irganox 1010 | 0.5 | Adekastab PEP-36 | 0.5 |
| Example 12 | Irganox 1076 | 0.5 | Adekastab PEP-36 | 0.5 |
| Example 13 | Adekastab AO-80 | 0.5 | Adekastab PEP-24 | 0.5 |
| Example 14 | Adekastab AO-80 | 0.5 | Adekastab PEP-36 | 0.5 |
| Example 15 | Irganox 565 | 0.5 | Irgafos 168 | 0.5 |
| Example 16 | Irganox 565 | 0.75 | Irgafos 168 | 0.75 |
| Example 17 | Irganox 1330 | 0.75 | Sandostab P-EPQ | 0.75 |
| Example 18 | Cyanox 1790 | 0.75 | Adekastab HP-10 | 0.75 |

TABLE 1A-2

| | Antioxidant | | | |
|---|---|---|---|---|
| | (B) phenolic antioxidant | | (C) antioxidant containing phosphorus | |
| | type | amount (part by wt.) | type | amount (part by wt.) |
| Comparative Example 1 | Irganox 565 | 0.5 | — | — |
| Comparative Example 2 | Irganox 565 | 1.0 | — | — |
| Comparative Example 3 | Cyanox 1790 | 1.0 | — | — |
| Comparative Example 4 | Irganox 1330 | 1.0 | — | — |
| Comparative Example 5 | Irganox 3114 | 1.0 | — | — |

TABLE 1B-1

| | physical properties before heat treatment | | physical properties after heat treatment | |
|---|---|---|---|---|
| | tensile strength (MPa) | YI | tensile strength (MPa) | retention (%) |
| Example 1 | 49 | 3 | 27 | 55 |
| Example 2 | 51 | 3 | 26 | 51 |
| Example 3 | 48 | 2 | 25 | 52 |
| Example 4 | 50 | 3 | 29 | 58 |
| Example 5 | 49 | 3 | 30 | 61 |
| Example 6 | 51 | 2 | 31 | 61 |
| Example 7 | 51 | 2 | 30 | 59 |
| Example 8 | 49 | 2 | 36 | 73 |
| Example 9 | 51 | 2 | 36 | 71 |
| Example 10 | 49 | 2 | 36 | 74 |
| Example 11 | 51 | 2 | 40 | 78 |
| Example 12 | 49 | 2 | 37 | 76 |
| Example 13 | 51 | 2 | 37 | 73 |
| Example 14 | 49 | 2 | 38 | 78 |
| Example 15 | 50 | 2 | 25 | 50 |
| Example 16 | 51 | 3 | 28 | 55 |
| Example 17 | 50 | 3 | 28 | 56 |
| Example 18 | 51 | 2 | 28 | 55 |

TABLE 1B-2

| | physical properties before heat treatment | | physical properties after heat treatment | |
|---|---|---|---|---|
| | tensile strength (MPa) | YI | tensile strength (MPa) | retention (%) |
| Comparative Example 1 | 49 | 6 | cracks formed, measurement not possible | |
| Comparative Example 2 | 50 | 8 | cracks formed, measurement not possible | |
| Comparative Example 3 | 49 | 9 | cracks formed, measurement not possible | |
| Comparative Example 4 | 49 | 9 | cracks formed, measurement not possible | |
| Comparative Example 5 | 50 | 8 | cracks formed, measurement not possible | |

EXAMPLES 19 TO 29 AND COMPARATIVE EXAMPLES 6 TO 8

In Examples 19 to 29 and Comparative Example 6 to 8 shown in Table 2A, antioxidants shown in Table 2A in amounts also shown in Table 2A were added to 100 parts by weight of a resin composition composed of 80% by weight of SPS obtained in Preparation Example 1 and 20% by weight of SEBS (a product of Shell Chemical Co., Ltd., trade name: Kraton G-1651), and the components were dry blended by a Henschel mixer. The obtained mixture was melt kneaded by a twin-screw extruder at a resin temperature of 300° C. and formed into pellets. The obtained pellets were injection molded at a resin temperature of 300° C. to obtain test pieces. The heat stability was evaluated by using the obtained test pieces. The results are shown in Table 2B.

TABLE 2A

| | Antioxidant | | | |
|---|---|---|---|---|
| | (B) phenolic antioxidant | | (C) antioxidant containing phosphorus | |
| | type | amount (part by wt.) | type | amount (part by wt.) |
| Example 19 | Irganox 1330 | 0.5 | Sandostab P-EPQ | 0.5 |
| Example 20 | Cyanox 1790 | 0.5 | Sandostab P-EPQ | 0.5 |
| Example 21 | Irganox 1010 | 0.5 | Sandostab P-EPQ | 0.5 |
| Example 22 | Irganox 245 | 0.5 | Adekastab PEP-36 | 0.5 |
| Example 23 | Irganox 1010 | 0.5 | Adekastab PEP-36 | 0.5 |
| Example 24 | Irganox 1076 | 0.5 | Adekastab PEP-36 | 0.5 |
| Example 25 | Adekastab AO-80 | 0.5 | Adekastab PEP-24 | 0.5 |
| Example 26 | Adekastab AO-80 | 0.5 | Adekastab PEP-36 | 0.5 |
| Example 27 | Irganox 565 | 0.5 | Irgafos 168 | 0.5 |
| Example 28 | Irganox 565 | 0.75 | Irgafos 168 | 0.75 |
| Example 29 | Irganox 1330 | 0.75 | Sandostab P-EPQ | 0.75 |
| Comparative Example 6 | Cyanox 1790 | 0.5 | — | — |
| Comparative Example 7 | Cyanox 1790 | 1.0 | — | — |
| Comparative Example 8 | Irganox 1330 | 1.0 | — | — |

TABLE 2B

| | physical properties before heat treatment | | physical properties after heat treatment | |
|---|---|---|---|---|
| | tensile strength (MPA) | YI | tensile strength (MPa) | retention (%) |
| Example 19 | 40 | 3 | 18 | 45 |
| Example 20 | 39 | 3 | 18 | 47 |
| Example 21 | 40 | 2 | 23 | 58 |
| Example 22 | 38 | 2 | 27 | 70 |
| Example 23 | 37 | 2 | 25 | 67 |
| Example 24 | 39 | 2 | 27 | 70 |
| Example 25 | 40 | 2 | 26 | 66 |
| Example 26 | 39 | 2 | 28 | 78 |
| Example 27 | 39 | 3 | 18 | 46 |
| Example 28 | 40 | 3 | 20 | 50 |
| Example 29 | 39 | 2 | 21 | 54 |
| Comparative Example 6 | 40 | 5 | cracks formed, measurement not possible | |
| Comparative Example 7 | 39 | 7 | cracks formed, measurement not possible | |
| Comparative Example 8 | 40 | 7 | cracks formed, measurement not possible | |

EXAMPLES 30 TO 39 AND COMPARATIVE EXAMPLES 9 TO 11

In Examples 30 to 39 and Comparative Example 9 to 11 shown in Table 3A, antioxidants shown in Table 3A in amounts also shown in Table 3A were added to 100 parts by weight of a resin composition obtained by adding 3 parts by weight of polyphenylene ether modified with maleic anhydride to 100 parts by weight of SPS obtained in Preparation Example 1, and the components were dry blended by a Henschel mixer. The obtained mixture was melt kneaded by a twin-screw extruder at a resin temperature of 300° C. with side feeding of glass fiber (a product of Nippon Denki Glass Co., Ltd., treated with aminosilane on the surface, trade name: ECS 03T-051/P) in such an amount that the content of the glass fiber was 30% by weight, and formed into pellets. The obtained pellets were injection molded at a resin temperature of 300° C. to obtain test pieces. The heat stability was evaluated by using the obtained test pieces. The results are shown in Table 3B.

TABLE 3A

| | Antioxidant | | | |
|---|---|---|---|---|
| | (B) phenolic antioxidant | | (C) antioxidant containing phosphorus | |
| | type | amount (part by wt.) | type | amount (part by wt.) |
| Example 30 | Irganox 565 | 0.5 | Adekastab HP-10 | 0.5 |
| Example 31 | Adekastab AO-80 | 0.5 | Irgafos 168 | 0.5 |
| Example 32 | Adekastab AO-80 | 0.5 | Sandostab P-EPQ | 0.5 |
| Example 33 | Irganox 245 | 0.5 | Adekastab PEP-36 | 0.5 |
| Example 34 | Irganox 1010 | 0.5 | Adekastab PEP-36 | 0.5 |
| Example 35 | Adekastab AO-80 | 0.5 | Adekastab PEP-24 | 0.5 |
| Example 36 | Adekastab AO-80 | 0.5 | Adekastab PEP-36 | 0.5 |
| Example 37 | Irganox 565 | 0.5 | Irgafos 168 | 0.5 |
| Example 38 | Irganox 565 | 0.75 | Irgafos 168 | 0.75 |
| Example 39 | Irganox 565 | 0.75 | Sandostab P-EPQ | 0.75 |
| Comparative Example 9 | Irganox 565 | 0.5 | — | — |
| Comparative Example 10 | Irganox 565 | 1.0 | — | — |
| Comparative Example 11 | Irganox 1330 | 1.0 | — | — |

TABLE 3B

| | physical properties before heat treatment | | physical properties after heat treatment | |
|---|---|---|---|---|
| | tensile strength (MPa) | YI | tensile strength (MPa) | retention (%) |
| Example 30 | 137 | 19 | 90 | 66 |
| Example 31 | 137 | 19 | 99 | 72 |
| Example 32 | 137 | 19 | 96 | 70 |
| Example 33 | 138 | 18 | 112 | 81 |
| Example 34 | 136 | 17 | 109 | 80 |
| Example 35 | 137 | 18 | 107 | 78 |
| Example 36 | 137 | 17 | 110 | 80 |
| Example 37 | 138 | 19 | 92 | 67 |
| Example 38 | 139 | 19 | 100 | 72 |
| Example 39 | 139 | 19 | 101 | 73 |
| Comparative Example 9 | 137 | 24 | 67 | 49 |
| Comparative Example 10 | 136 | 25 | 72 | 53 |
| Comparative Example 11 | 136 | 25 | 12 | 52 |

EXAMPLES 40 TO 48 AND COMPARATIVE EXAMPLES 12 TO 14

In Examples 40 to 48 and Comparative Example 12 to 14 shown in Table 4A, antioxidants shown in Table 4A in amounts also shown in Table 3A were added to 100 parts by weight of a mixture obtained by adding 3 parts by weight of polyphenylene ether modified with maleic anhydride to 100 parts by weight of a resin composition composed of 90% by weight of SPS obtained in Preparation Example 1 and 10% by weight of SEBS (a product of Shell Chemical Co., Ltd., trade name: Kraton G-1651), and the components were dry blended by a Henschel mixer. The obtained mixture was melt kneaded by a twin-screw extruder at a resin temperature of 300° C. with side feeding of glass fiber (a product of Nippon Denki Glass Co., Ltd., treated with aminosilane on the surface, trade name: ECS 03T-051/P) in such an amount that the content of the glass fiber was 30% by weight, and formed into pellets. The obtained pellets were injection molded at a resin temperature of 300° C. to obtain test pieces. The heat stability was evaluated by using the obtained test pieces. The results are shown in Table 4B.

TABLE 4A

| | Antioxidant | | | |
|---|---|---|---|---|
| | (B) phenolic antioxidant | | (C) antioxidant containing phosphorus | |
| | type | amount (part by wt.) | type | amount (part by wt.) |
| Example 40 | Irganox 565 | 0.5 | Irgafos 168 | 0.5 |
| Example 41 | Irganox 1010 | 0.5 | Adekastab HP-10 | 0.5 |
| Example 42 | Irganox 245 | 0.5 | Adekastab PEP-36 | 0.5 |
| Example 43 | Irganox 1010 | 0.5 | Adekastab PEP-24 | 0.5 |
| Example 44 | Irganox 1010 | 0.5 | Adekastab PEP-36 | 0.5 |
| Example 45 | Irganox 1076 | 0.5 | Adekastab PEP-36 | 0.5 |
| Example 46 | Adekastab AO-80 | 0.5 | Adekastab PEP-36 | 0.5 |
| Example 47 | Irganox 565 | 0.75 | Irgafos 168 | 0.75 |
| Example 48 | Irganox 1330 | 0.75 | Sandostab P-EPQ | 0.75 |
| Comparative Example 12 | Irganox 565 | 0.5 | — | — |
| Comparative Example 13 | Irganox 565 | 1.0 | — | — |
| Comparative Example 14 | Irganox 1330 | 1.0 | — | — |

TABLE 4B

| | physical properties before heat treatment | | physical properties after heat treatment | |
|---|---|---|---|---|
| | tensile strength (MPa) | YI | tensile strength (MPa) | retention (%) |
| Example 40 | 129 | 15 | 90 | 70 |
| Example 41 | 130 | 15 | 90 | 69 |
| Example 42 | 128 | 13 | 105 | 82 |
| Example 43 | 127 | 14 | 102 | 80 |
| Example 44 | 129 | 13 | 104 | 81 |
| Example 45 | 129 | 13 | 103 | 80 |
| Example 46 | 129 | 13 | 107 | 83 |
| Example 47 | 129 | 15 | 94 | 73 |
| Example 48 | 130 | 15 | 94 | 72 |
| Comparative Example 12 | 130 | 21 | 66 | 51 |
| Comparative Example 13 | 129 | 20 | 70 | 54 |
| Comparative Example 14 | 129 | 20 | 70 | 54 |

EXAMPLES 49 TO 61

In Examples 49 to 61 shown in Table 5A, antioxidants shown in Table 5A in amounts also shown in Table 5A were added to 100 parts by weight of SPS obtained in Preparation Example 1, and the components were dry blended by a Henschel mixer. The obtained mixture was melt kneaded by a twin-screw extruder at a resin temperature of 300° C. and formed into pellets. The obtained pellets were injection molded at a resin temperature of 300° C. to obtain test pieces. The heat stability was evaluated by using the obtained test pieces. The results are shown in Table 5B.

TABLE 5A

| | Antioxidant | | | | | |
|---|---|---|---|---|---|---|
| | (B) phenolic antioxidant | | (C) antioxidant containing phosphorus | | (D) antioxidant containing sulfur | |
| | type*1 | amount (part by wt.) | type*2 | amount (part by wt.) | type*3 | amount (part by wt.) |
| Example 49 | I.n. 245 | 0.5 | San. HP-10 | 0.5 | Sum. TMP | 0.5 |
| Example 50 | I.n. 1010 | 0.5 | San. P-EPQ | 0.5 | Sum. TMP | 0.5 |
| Example 51 | I.n. 1010 | 0.5 | I.f. 168 | 0.5 | Sum. TPL-R | 0.5 |
| Example 52 | Ade. AO-80 | 0.5 | I.f. 168 | 0.5 | Sum. TPS | 0.5 |
| Example 53 | I.n. 1010 | 0.5 | I.f. 168 | 0.5 | Sum. TP-D | 0.5 |
| Example 54 | I.n. 1076 | 0.5 | I.f. 168 | 0.5 | Sum. TP-D | 0.5 |
| Example 55 | Ade. AO-80 | 0.5 | I.f. 168 | 0.5 | Sum. TP-D | 0.5 |
| Example 56 | I.n. 245 | 0.5 | Ade. PEP-36 | 0.5 | Sum. TP-D | 0.5 |
| Example 57 | I.n. 245 | 0.5 | Ade. PEP-36 | 0.5 | Sum. TP-D | 0.5 |
| Example 58 | I.n. 1010 | 0.5 | Ade. PEP-36 | 0.5 | Sum. TP-D | 0.5 |
| Example 59 | I.n. 1076 | 0.5 | Ade. PEP-36 | 0.5 | Sum. TP-D | 0.5 |
| Example 60 | Ade. AO-80 | 0.5 | Ade. PEP-24 | 0.5 | Sum. TP-D | 0.5 |
| Example 61 | Ade. AO-80 | 0.5 | Ade. PEP-36 | 0.5 | Sum. TP-D | 0.5 |

*1 I.n.: Irganox, Ade.: Adekastab
*2 San.: Sandostab, I.f.: Irgafos, Ade.: Adekastab
*3 Sum.: Sumilizer

TABLE 5B

| | physical properties before heat treatment | | physical properties after heat treatment | |
|---|---|---|---|---|
| | tensile strength (MPa) | YI | tensile strength (MPa) | retention (%) |
| Example 49 | 51 | 2 | 39 | 76 |
| Example 50 | 50 | 3 | 38 | 76 |
| Example 51 | 51 | 3 | 40 | 78 |
| Example 52 | 48 | 2 | 38 | 79 |
| Example 53 | 49 | 2 | 41 | 84 |
| Example 54 | 50 | 3 | 41 | 82 |
| Example 55 | 49 | 3 | 41 | 84 |
| Example 56 | 48 | 2 | 46 | 96 |
| Example 57 | 48 | 2 | 46 | 96 |
| Example 58 | 50 | 2 | 47 | 94 |
| Example 59 | 51 | 2 | 47 | 92 |
| Example 60 | 49 | 2 | 46 | 94 |
| Example 61 | 49 | 2 | 46 | 94 |

EXAMPLES 62 TO 68

In Examples 62 to 68 shown in Table 6A, antioxidants shown in Table 6A in amounts also shown in Table 6A were added to 100 parts by weight of a resin composition composed of 80% by weight of SPS obtained in Preparation Example 1 and 20% by weight of SEBS (a product of Shell Chemical Co., Ltd., trade name: Kraton G-1651), and the components were dry blended by a Henschel mixer. The obtained mixture was melt kneaded by a twin-screw extruder at a resin temperature of 300° C. and formed into pellets. The obtained pellets were injection molded at a resin temperature of 300° C. to obtain test pieces. The heat stability was evaluated by using the obtained test pieces. The results are shown in Table 6B.

TABLE 6A

| | Antioxidant | | | | | |
|---|---|---|---|---|---|---|
| | (B) phenolic antioxidant | | (C) antioxidant containing phosphorus | | (D) antioxidant containing sulfur | |
| | type*1 | amount (part by wt.) | type*2 | amount (part by wt.) | type*3 | amount (part by wt.) |
| Example 62 | I.n. 1010 | 0.5 | I.f. 168 | 0.5 | Sum. TPM | 0.5 |
| Example 63 | I.n. 1010 | 0.5 | I.f. 168 | 0.5 | Sum. TP-D | 0.5 |
| Example 64 | I.n. 1010 | 0.5 | Ade. PEP-36 | 0.5 | Sum. TP-D | 0.5 |
| Example 65 | I.n. 1010 | 0.5 | Ade. PEP-36 | 0.5 | Sum. TP-D | 0.5 |
| Example 66 | I.n. 1010 | 0.5 | Ade. PEP-36 | 0.5 | Sum. TP-D | 0.5 |
| Example 67 | Ade. AO-80 | 0.5 | Ade. PEP-24 | 0.5 | Sum. TP-D | 0.5 |
| Example 68 | Ade. AO-80 | 0.5 | Ade. PEP-36 | 0.5 | Sum. TP-D | 0.5 |

*1 I.n.: Irganox, Ade.: Adekastab
*2 San.: Sandostab, I.f.: Irgafos, Ade.: Adekastab
*3 Sum.: Sumilizer

TABLE 6B

| | physical properties before heat treatment | | physical properties after heat treatment | |
|---|---|---|---|---|
| | tensile strength (MPa) | YI | tensile strength (MPa) | retention (%) |
| Example 62 | 38 | 3 | 26 | 69 |
| Example 63 | 40 | 2 | 32 | 79 |
| Example 64 | 40 | 2 | 38 | 95 |
| Example 65 | 38 | 2 | 37 | 97 |
| Example 66 | 39 | 2 | 38 | 97 |
| Example 67 | 39 | 2 | 36 | 92 |
| Example 68 | 40 | 2 | 38 | 95 |

EXAMPLES 69 TO 73

In Examples 69 to 73 shown in Table 7A, antioxidants shown in Table 7A in amounts also shown in Table 7A were added to 100 parts by weight of a resin composition obtained by adding 3 parts by weight of polyphenylene ether modified with maleic anhydride to 100 parts by weight of SPS obtained in Preparation Example 1, and the components were dry blended by a Henschel mixer. The obtained mixture was melt kneaded by a twin-screw extruder at a resin temperature of 300° C. with side feeding of glass fiber (a product of Nippon Denki Glass Co., Ltd., treated with aminosilane on the surface, trade name: ECS 03T-051/P) in such an amount that the content of the glass fiber was 30% by weight, and formed into pellets. The obtained pellets were injection molded at a resin temperature of 300° C. to obtain test pieces. The heat stability was evaluated by using the obtained test pieces. The results are shown in Table 7B.

TABLE 7A

| | Antioxidant | | | | | |
|---|---|---|---|---|---|---|
| | (B) phenolic antioxidant | | (C) antioxidant containing phosphorus | | (D) antioxidant containing sulfur | |
| | type*1 | amount (part by wt.) | type*2 | amount (part by wt.) | type*3 | amount (part by wt.) |
| Example 69 | I.n. 1010 | 0.5 | Ade. HP-10 | 0.5 | Sum. TPS | 0.5 |
| Example 70 | I.n. 1010 | 0.5 | Ade. HP-10 | 0.5 | Sum. TP-D | 0.5 |
| Example 71 | I.n. 1010 | 0.5 | Ade. PEP-24 | 0.5 | Sum. TP-D | 0.5 |
| Example 72 | I.n. 1010 | 0.5 | Ade. PEP-36 | 0.5 | Sum. TP-D | 0.5 |
| Example 73 | Ade. AO-80 | 0.5 | Ade. PEP-36 | 0.5 | Sum. TP-D | 0.5 |

*1 I.n.: Irganox, Ade.: Adekastab
*2 San.: Sandostab, I.f.: Irgafos, Ade.: Adekastab
*3 Sum.: Sumilizer

TABLE 7B

|  | physical properties before heat treatment | | physical properties after heat treatment | |
|---|---|---|---|---|
|  | tensile strength (MPa) | YI | tensile strength (MPa) | retention (%) |
| Example 69 | 138 | 19 | 108 | 78 |
| Example 70 | 138 | 18 | 116 | 84 |
| Example 71 | 139 | 17 | 138 | 98 |
| Example 72 | 137 | 18 | 138 | 101 |
| Example 73 | 138 | 17 | 138 | 100 |

EXAMPLES 74 TO 79

In Examples 74 to 79 shown in Table 8A, antioxidants shown in Table 8A in amounts also shown in Table 8A were added to 100 parts by weight of a mixture obtained by adding 3 parts by weight of polyphenylene ether modified with maleic anhydride to 100 parts by weight of a resin composition composed of 90% by weight of SPS obtained in Preparation Example 1 and 10% by weight of SEBS (a product of Shell Chemical Co., Ltd., trade name: Kraton G-1651), and the components were dry blended by a Henschel mixer. The obtained mixture was melt kneaded by a twin-screw extruder at a resin temperature of 300° C. with side feeding of glass fiber (a product of Nippon Denki Glass Co., Ltd., treated with aminosilane on the surface, trade name: ECS 03T-051/P) in such an amount that the content of the glass fiber was 30% by weight, and formed into pellets. The obtained pellets were injection molded at a resin temperature of 300° C. to obtain test pieces. The heat stability was evaluated by using the obtained test pieces. The results are shown in Table 8B.

TABLE 8A

| | Antioxidant | | | | | |
|---|---|---|---|---|---|---|
| | (B) phenolic antioxidant | | (C) antioxidant containing phosphorus | | (D) antioxidant containing sulfur | |
| | type*1 | amount (part by wt.) | type*2 | amount (part by wt.) | type*3 | amount (part by wt.) |
| Example 74 | I.n. 1010 | 0.5 | San. P-EPQ | 0.5 | Sum. TPM | 0.5 |
| Example 75 | I.n. 1010 | 0.5 | San. P-EPQ | 0.5 | Sum. TP-D | 0.5 |
| Example 76 | I.n. 245 | 0.5 | Ade. PEP-36 | 0.5 | Sum. TP-D | 0.5 |
| Example 77 | I.n. 1010 | 0.5 | Ade. PEP-36 | 0.5 | Sum. TP-D | 0.5 |
| Example 78 | I.n. 1076 | 0.5 | Ade. PEP-36 | 0.5 | Sum. TP-D | 0.5 |
| Example 79 | Ade. AO-80 | 0.5 | Ade. PEP-36 | 0.5 | Sum. TP-D | 0.5 |

*1 I.n.: Irganox, Ade.: Adekastab
*2 San.: Sandostab, I.f.: Irgafos, Ade.: Adekastab
*3 Sum.: Sumilizer

TABLE 8B

|  | physical properties before heat treatment | | physical properties after heat treatment | |
|---|---|---|---|---|
|  | tensile strength (MPa) | YI | tensile strength (MPa) | retention (%) |
| Example 74 | 128 | 14 | 102 | 80 |
| Example 75 | 130 | 14 | 113 | 87 |
| Example 76 | 130 | 13 | 129 | 99 |
| Example 77 | 129 | 13 | 129 | 100 |
| Example 78 | 130 | 13 | 128 | 98 |
| Example 79 | 128 | 13 | 129 | 101 |

INDUSTRIAL APPLICABILITY

As described above, the polystyrenic resin of the present invention is a resin composition having remarkably increased heat stability and durability while the proper characteristics of SPS, such as heat resistance, chemical resistance, impact resistance, and mechanical strength, are maintained. Therefore, the resin composition of the present invention can be used as the material for molded articles particularly when heat stability in processing is required, for example, when a relatively high molding temperature or a relatively long residence time is required. The resin composition of the present invention is advantageously used also as the material for molded articles to which excellent resistance to heat aging is required.

Specifically, the application of the resin composition of the present invention can be expanded in the field of molded articles to which a low specific gravity, high strength, high heat resistance, high chemical resistance, high resistance to hydrolysis, low permittivity, or high durability is required. The resin composition is particularly advantageous in the field of mechanical parts, electric and electronic parts, films, and fibers to which heat resistance is required.

What is claimed is:

1. A polystyrenic resin composition which comprises 100 parts by weight of (A) a resin obtained by mixing 100 parts by weight of a resin comprising
   99.9 to 90.0% by weight of (a-1) a styrenic polymer having a syndiotactic configuration and
   0.1 to 10% by weight of (a-3) of polyphenylene ether modified with at least one compound selected from the group consisting of maleic anhydride, fumaric acid and glycidyl methacrylate;

0.005 to 5.0 parts by weight of (B) a phenolic antioxidant, 0.005 to 5.0 parts by weight of (C) an antioxidant containing phosphorus, and 0.005 to 5.0 parts by weight of (D) an antioxidant containing sulfur and 1 to 350 parts by weight of (E) an inorganic filler, based on 100 parts by weigh of (A);

wherein the phenolic antioxidant of component (B) is represented by general formula (I):

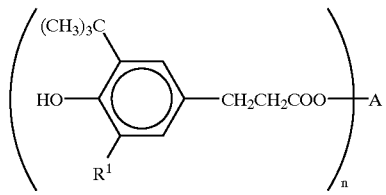

wherein $R^1$ represents methyl group or t-butyl group, A represents a residue group obtained by eliminating n hydroxyl groups from an alcohol having 1 to 4 hydroxyl groups and n represents an integer of 1 to 4;

the antioxidant containing phosphorus of component (C) is represented by general formula (II):

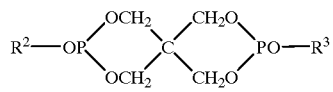

wherein $R^2$ and $R^3$ each independently represents an alkyl group, an aryl group, or an alkylaryl group; and the antioxidant containing sulfur of component (D) is represented by general formulation (III):

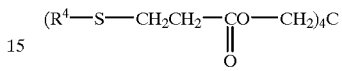

wherein $R^4$ represents an alkyl group having 6, 12 or 18 carbon atoms.

2. A molded article obtained by a process comprising molding the polystyrenic resin composition of claim 1 to produce said molded article.

3. A method of producing a molded article comprising molding the polystyrenic resin composition according to claim 1 to produce said molded article.

4. A molded article which is prepared using the polystyrenic resin composition described in claim 1.

* * * * *